United States Patent
Guendel et al.

(10) Patent No.: US 6,380,958 B1
(45) Date of Patent: Apr. 30, 2002

(54) MEDICAL-TECHNICAL SYSTEM

(75) Inventors: Lutz Guendel, Erlangen; Gerd Wessels, Effeltrich, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/394,520

(22) Filed: Sep. 10, 1999

(30) Foreign Application Priority Data

Sep. 15, 1998 (DE) .......................... 198 42 239

(51) Int. Cl.[7] .................. G06F 3/14; G06F 17/00; A61B 19/00; G06T 15/20
(52) U.S. Cl. .................. 345/848; 345/427; 345/851; 600/425; 600/427; 378/4
(58) Field of Search .................. 345/848, 851, 345/849, 850, 419, 427, 424, 804, 781, 771; 600/407, 425, 427, 411, 416, 417; 606/130; 378/4, 21, 901

(56) References Cited

U.S. PATENT DOCUMENTS

| | | | |
|---|---|---|---|
| 4,984,157 A | * 1/1991 | Cline et al. | 345/424 |
| 5,371,778 A | * 12/1994 | Yanof et al. | 378/4 |
| 5,494,034 A | 2/1996 | Schlöndorff et al. | 600/425 |
| 5,623,586 A | 4/1997 | Höhne | 345/424 |
| 5,715,836 A | 2/1998 | Kliegis et al. | 600/425 |
| 5,734,384 A | * 3/1998 | Yanof et al. | 345/424 |
| 5,859,891 A | * 1/1999 | Hibbard | 600/427 X |
| 5,967,982 A | * 10/1999 | Barnett | 606/130 X |
| 6,064,904 A | * 5/2000 | Yanof et al. | 606/130 X |

FOREIGN PATENT DOCUMENTS

WO   WO 91/07726   5/1991   ............ G06F/15/72

* cited by examiner

Primary Examiner—Raymond J. Bayerl
(74) Attorney, Agent, or Firm—Shiff Hardin & Waite

(57) ABSTRACT

A medical technical system computing unit for calculating a multi-dimensional image dataset from subject signals supplied to the computing unit and obtained from the examination of a subject with at least one pre-operative imaging method. A virtual, multi-dimensional image that can be calculated from the multi-dimensional image dataset via the computing unit can be displayed on a display unit. A controllable window can be displayed at the display unit via a window generator allocated to the computing unit. The image at the display means corresponding to a virtual location of the controllable window controllable is produced via a control unit allocated to the computing unit.

55 Claims, 4 Drawing Sheets

MEDICAL-TECHNICAL SYSTEM

BACKGROUND OF THE INVENTION

1. Field of the Invention

The present invention is directed to a medical-technical apparatus of the type having at least one computing unit for calculating a multi-dimensional image dataset of a subject with subject signals obtained with at least one preoperative imaging method and supplied to the computing unit.

2. Description of the Prior Art

A virtual multi-dimensional image can be calculated from the multi-dimensional image dataset by the computing unit and can be displayed at a display unit following the computing unit. Such medical-technical systems can be x-ray systems, ultrasound systems, magnetic resonance systems or some other imaging systems and are well known. Window generators for producing a controllable window displayable at the display unit are known particularly in computed tomography and magnetic resonance systems. These windows serve the purpose of characterizing a region of interest by magnification of the voxel values in this window. Further, endoscopic and laparoscopic imaging methods are known that are intracorporeally or intra-operatively utilized in order to obtain real time images that can be displayed either directly and/or via a display unit. Further, examination subjects can be treated and/or examined with endoscopes and/or laparoscopes.

SUMMARY OF THE INVENTION

An object of the present invention is to provide a medical-technical system of the type initially described which makes a number of information presentations, particularly images, available to the user for the examination or treatment of an examination subject.

The above object is achieved in accordance with the principles of the present invention in a medical-technical system having an imaging system which is operable according to a pre-operative (e.g. non-invasive) imaging modality to obtain subject signals from an examination subject, a computing unit supplied with the subject signals which calculates a multi-dimensional dataset therefrom, a display unit connected to the calculating unit which displays a virtual, multi-dimensional image produced in the calculating unit from the multi-dimensional image dataset, a window generator connected to the computing unit which generates a controllable window displayed at the display unit, and a control unit connected to the computing unit for controlling the production of the virtual, multi-dimensional image in the computing unit by including a virtual location of the window in the virtual, multi-dimensional image, the virtual location of the window being controlled by the control unit.

An advantage of the invention is that the computing unit has a control unit allocated to it for controlling the image output on the basis of the multi-dimensional image dataset corresponding to a virtual location of the controllable window at the display unit that can be controlled via the control unit. In addition to the information derived from the virtual multi-dimensional image, thus the information derived from the control of the window dependent on the virtual location can also be used. According to the invention, consequently, it is possible, for example, to display a two-dimensional image at the display unit and, given the presence of, for example, a three-dimensional image dataset, to adjust the window, for example, into the "depth" of the image, so that image information that lie outside the plane of the two-dimensional image also are displayed.

The computing unit can calculate a multi-dimensional image dataset on the basis of the examination of a subject with subject signals, obtained with at least one preoperative (e.g. non-invasive) imaging method, and one further imaging method, supplied to the computing unit. The image output can be effected on the basis of subject signals obtained with the preoperative or with the further imaging method, at the display unit in the window corresponding to a virtual location of the controllable window controllable via the control unit. In addition to the information from the preoperatively acquired subject signals, thus, it is possible, for example, to additionally mix the information into the window that were obtained by the further imaging method. For example, the image information obtained from a magnetic resonance method, ultrasound method endoscopic or laparoscopic method can be displayed in the window in an x-ray image as the pre-operatively imaging method.

It is advantageous when at least two overlapping, preoperative imaging methods are utilized for producing a multi-dimensional image dataset in the examination of a subject, since image information that are distinct from one another thus can be made available to the examining person.

It is advantageous to produce a multi-dimensional image dataset for each pre-operative imaging method. It is also advantageous to manipulate the multi-dimensional image datasets via the computing unit to form a further multi-dimensional image dataset. In a further embodiment, on the basis of the multi-dimensional image datasets, a virtual multi-dimensional image or a manipulated virtual multi-dimensional image can be displayed at the display unit. The information available to the examining person is increased compared to a single imaging method. The multi-dimensional image datasets and the images are three-dimensional, so that a spatial depth and/or positional identification of, for example, organs or vessels is also possible.

In an embodiment wherein a number of windows are controllable via the control unit and wherein an image output corresponding to each virtual location of the respective window ensues on the basis of the multi-dimensional image dataset, then a region of interest or a location of interest in the virtual image can be viewed from different directions.

A magnified (enlarged) display of the information in-the controllable window is possible in an embodiment wherein the image output can be effected at a further display area corresponding to the virtual location of the controllable window, controllable via the control unit.

In an embodiment wherein a virtual, three-dimensional image output ensues according to the control of the window via one or more virtual channels, then the information can be made visibly available not only at the end face of the channel in the window but also can be made visibly available to the examining person at the edge region thereof.

In order to make the spatial orientation of the controllable window more displayable to the examining person, in a further embodiment a virtual, three-dimensional image of the examined subject is produced via the computing unit on the basis of the multi-dimensional image dataset and the virtual location of the controllable window is displayable in the virtual three-dimensional image at the display unit. This is also particularly true in a version wherein the virtual channel of the controllable window is displayed in the virtual, three-dimensional image of the examined subject because the course of the channel is then visible for the examining person.

In an embodiment wherein the computing unit has an instrument generating unit allocated to it for generating a display of at least one virtual instrument at the display unit and wherein the instrument generating unit can be influenced via the control unit for controlling the display of the virtual instrument in view of a virtual location in the virtual three-dimensional image, then, for example, the instrument guidance can be pre-planned in a planned examination or treatment of the subject.

In an embodiment wherein signals corresponding to the control of the virtual instrument can be generated and supplied to a controllable robot arm allocated to the computing unit, and wherein the robot arm is controlled corresponding to the control of the virtual instrument, then a treatment or examination of the subject assisted by the robot arm can be implemented via the inventive medical-technical system.

In an embodiment wherein the computing unit is supplied with subject signals generated with at least one intra-operative imaging method and wherein signals are displayed at the display unit as a real-time image, then the examining person or treating person not only receives the information produced by the (at least one) pre-operative imaging method, but also receives the image information that can be generated directly and immediately at the location and site of the treatment or examination. For example, it is thus possible to make current, supplementary information obtained with the intra-operative imaging method on the basis of, for example, the electrical conversion of physical signals, particularly optical and/or acoustic signals and/or radiation, available to the examining person or treating person at the display unit. This is particularly true when endoscopes or laparoscopes are employed for this purpose.

When endoscopes and/or laparoscopes are used for the intra-operative imaging and/or as examination instruments and/or as treatment instruments, then it is advantageous to provide means for real-time location detection and a location generator for generating a location mark at the display unit corresponding to the real-time location of the endoscope, laparoscope and/or the instrument in the virtual image, since the current position can thus always be displayed in the virtual, preferably three-dimensional, image at the display unit. Additionally, it is advantageous to display the displacement path of the endoscope, the laparoscope and/or the instrument in the virtual three-dimensional image as a channel that can be generated by the location generator.

For preparing a diagnosis, and in particular for planning treatment, it is advantageous to provide means for determining the spatial coordinates and/or the spacings between two locations identified in the virtual and/or real image. For example, the distance between an instrument and a vessel or the distance between the subject being sought and neighboring tissue or a neighboring organ can be determined or the spatial attitude can be defined.

In an embodiment wherein the control unit has an evaluation unit allocated to it for evaluating at least one voxel in the window dependent or its voxel value, the evaluation unit generating a signal when the voxel value lies within or beyond a prescribable range and/or under and/or over a prescribable voxel value. Then, for example when planning a treatment, a treatment channel (path) can be identified that is oriented such that it does not proceed through a vessel or an organ whose voxel values define, for example, the prescribable area. A number of voxels in the window preferably can be utilized for this purpose, allowing the diameter of the treatment channel also to be defined. It is advantageous when, on the basis of the signal of the evaluation means, a direction-linked control of the window is enabled or suppressed. The window thus can be guided only into subject areas wherein there is no risk that the channel unintentionally proceeds through a vessel or an organ.

In an embodiment having means for producing a connecting line between a first location and a second location in the virtual, multi-dimensional image, then, for example, a connecting line can be drawn between a planned entry opening for the introduction of an instrument into the body of the subject as the first location and the region to be examined or treated as the second location, this line representing the channel for the introduction of the instrument. It is especially advantageous in conjunction therewith to undertake a calculation for the connecting line, proceeding from the first location to the second location taking at least one prescribable voxel value into consideration, since this will again insure no risk of the channel unintentionally proceeding through an organ or a vessel. When the second location can be defined by the means for real-time location detection, then, for example proceeding from the location at which the endoscope or the laparoscope is located, a channel to the exterior surface of the examination subject can be calculated that is defined by the connecting line, which can serve as introduction aid for a further instrument.

Within the framework of the invention, the computing unit can also calculate a third location taking the aforementioned at least one voxel value into consideration, this third location being optimally close to the first location. By displaying the connecting line at the display unit, the third location, which is better suited for avoiding damage and/or injury of organs or vessels, can be defined in the proximity of the first location, proceeding from a desired entry location into the subject that corresponds to the first location.

In an embodiment wherein an examination and/or treatment instrument has an instrument locator allocated to it for generating an instrument location signal, and wherein the instrument location signal is supplied to the computing unit, which generates a signal when the instrument is adjusted onto/or deviating from the connecting line, then this signal makes it possible to track whether the examination and/or treatment instrument is being guided on the previously calculated, optimum treatment channel to the location in the subject to be treated or to be examined. When a number of examination and/or treatment instruments are employed, then it is advantageous for a number of first and/or second and/or third locations to be prescribed or calculated.

In an embodiment wherein the endoscope or the laparoscope makes use of an ultrasound imaging method, then, in addition to the real-time optical image signals, the imaging signals of the ultrasound method can also supply further information for the examining person or treating person during the examination or treatment.

DESCRIPTION OF THE PREFERRED EMBODIMENTS

Figure 1:
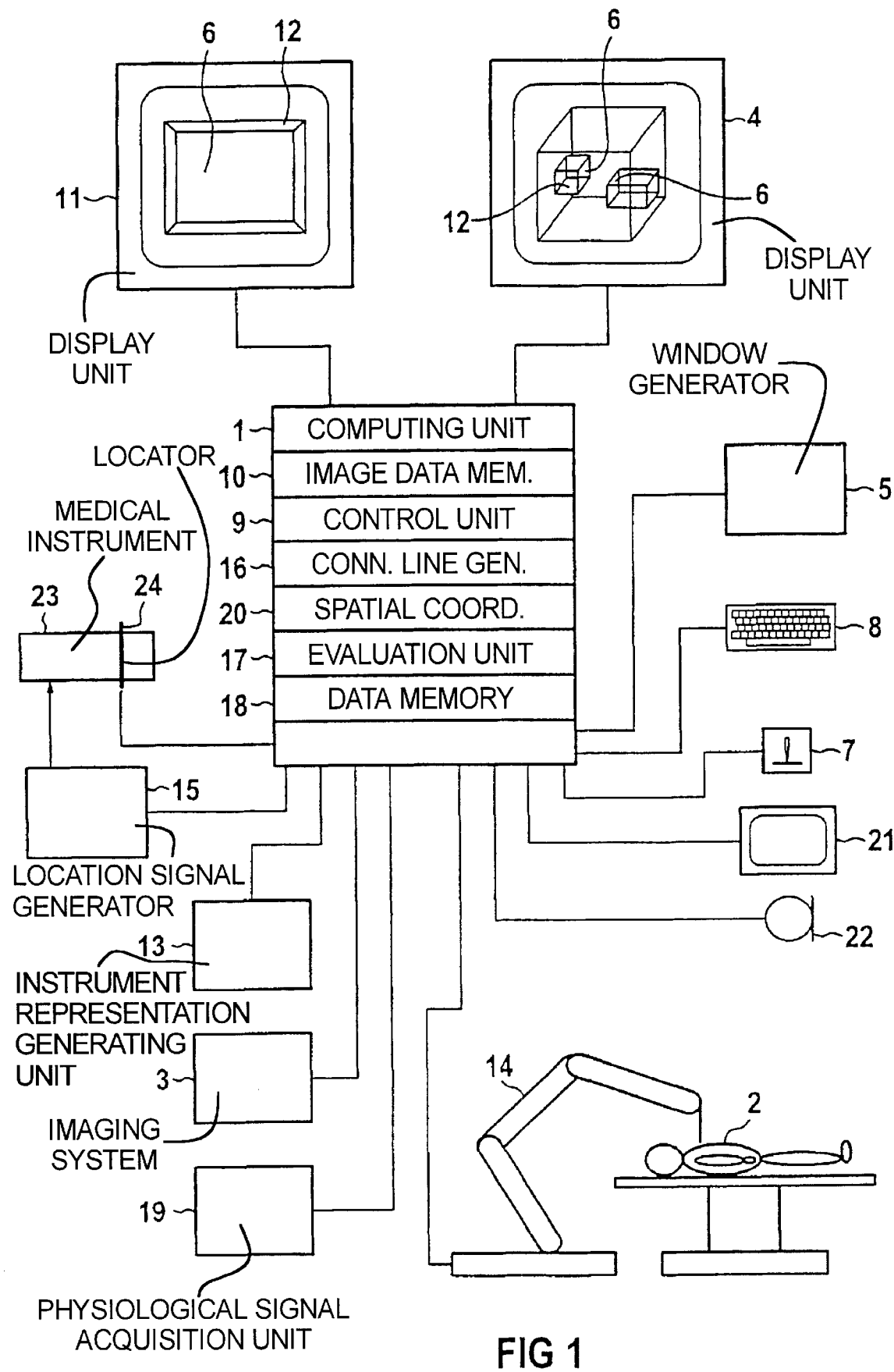
FIG. 1 shows a medical-technical system of the invention in a schematic illustration.
Figure 2:
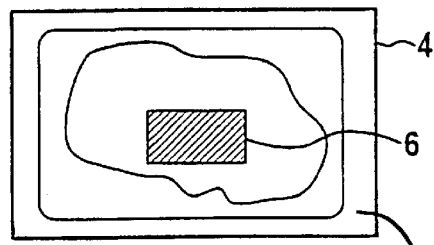
FIGS. 2 through 9 and 11 show representative graphic illustrations at the display unit of the medical-technical system according to FIG. 1, for explaining the operation thereof.

FIG. 1 schematically shows an exemplary embodiment of a medical-technical system of the invention. The medical-technical system has a computing unit 1 for calculating an image dataset, preferably a multi-dimensional image dataset, based on subject signals supplied to the computing unit 1 obtained from the examination of a subject 2 with at least one pre-operative imaging method. The subject signals of the pre-operative imaging method can be obtained by an imaging system 3 that, for example, can be a computed tomography apparatus, an x-ray apparatus, an ultrasound apparatus and/or a magnetic resonance apparatus. The computing unit 1 is followed by a display unit 4, so that a graphic presentation of a virtual, multi-dimensional image that can be calculated from the image dataset via the computing unit 1 is available. The computing unit 1 also has a window generator 5 allocated to it that serves the purpose of generating a controllable window 6 that can be displayed on the display unit 4 (FIG. 2). For example, the window 6 can be controlled via a joystick 7 or via an input unit 8, for example, a keyboard. The computing unit 1 also has a control unit 9 allocated to it that accesses the image dataset stored in a memory 10 and, via the computing unit 1, effects an image output at the display unit 4 corresponding to a virtual location of the controllable window 6 controllable by the control unit 9.

The subject signals can be obtained from at least one pre-operative imaging method and at least one further imaging method, the subject signals obtained with the further imaging method preferably being output as an image in the window 6 corresponding to a virtual location of the controllable window 6 at the display unit 4. Preferably, an image output can ensue by switching onto the subject signal received by the pre-operative imaging or by the further imaging method. This is particularly meaningful when the subject 2 is examined with two different pre-operative imaging methods or a further imaging method distinct therefrom.

Figure 3:
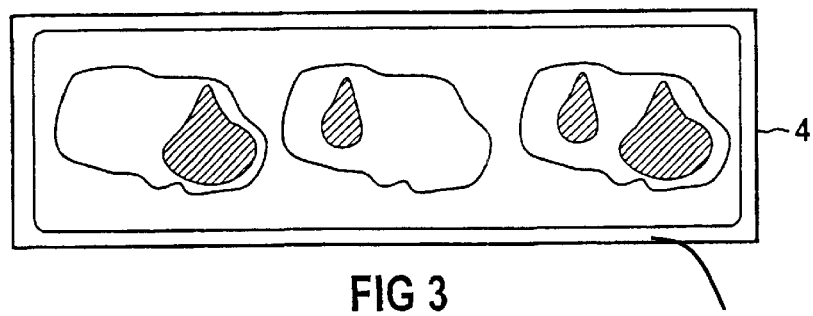

A multi-dimensional image dataset can be stored in the memory 10 for each pre-operative imaging method and each further imaging method and/or the subject signals obtained by the imaging method can be manipulated to form a further multi-dimensional image dataset via the computing unit 1. On the basis of the multi-dimensional image datasets, it is thus possible to display a virtual multi-dimensional image or a manipulated, virtual multi-dimensional image at the display unit 4 (FIG. 3).

Figure 4:
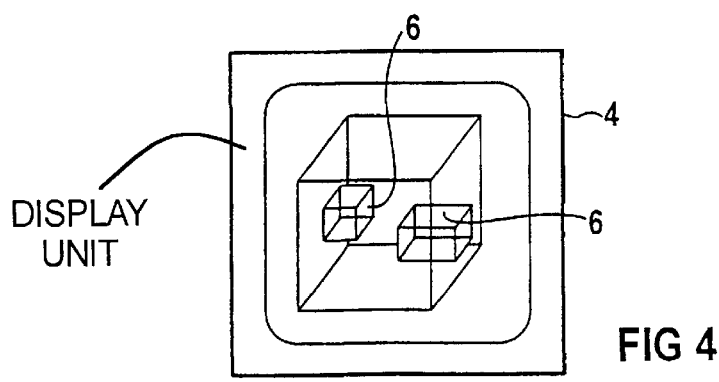

In order to be able to display the spatial conditions of the organs of the subject 2 optimally well in their arrangement relative to one another, it is advantageous for the multi-dimensional image datasets and at least the one virtual multi-dimensional image to be three-dimensional, or three-dimensionally displayed (FIG. 4).

As can be seen from the Figures, a number of windows 6 are controllable via the control unit 9, with an image output corresponding to every virtual location of the respective window 6 ensuing on the basis of the multi-dimensional image dataset. A region to be examined or to be treated in the subject 2 thus can be viewed from different directions in the virtual three-dimensional image. The computing unit 1 can have a further display unit 11 allocated to it at which, for example, an image output can be generated corresponding to the control of the window 6. Alternatively, a corresponding display area can also be allocated to the display unit 4. The provision of a further display unit 11 has the advantage that the image information of the window can be displayed on a larger area. It is also advantageous to effect the image output corresponding to the control of the window 6 according to a virtual channel 12 in the virtual three-dimensional image, since structures at the "wall" of the channel thus can also be displayed and can be recognized by the examining person. Of course, a number of virtual channels 12 corresponding to the control of respective windows 6 can also be displayed at the display unit 4 or at the further display unit 11.

Figure 5:
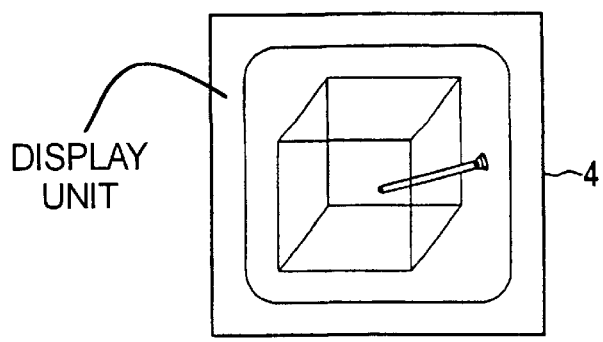

As also shown in FIG. 1 the computing unit 1 has an instrument representation generating unit 13 allocated to it, which generates a displayed representation of at least one virtual instrument (FIG. 5) at the display unit 4 in conjunction with the computing unit 1. Preferably, the virtual instrument can be controlled at the display unit 4 by the control unit 9, from input signal supplied via the joystick 7, the input unit 8, a touch screen 21 and/or a voice input unit 22. The virtual instrument thus can be brought to a location in the virtual three-dimensional image at which, for example, a treatment or examination is to ensue. Signals corresponding to the control of the virtual instrument are generated and are supplied via the computing unit 1 to a controllable robot arm 14, so that a treatment or examination of the subject 2 can be undertaken at a spatially remote location. A remote diagnosis or treatment is thus possible. Particularly in micro-surgery but also in prosthetics, such a robot arms 14 can be beneficially utilized since it enables high precision of the treatment; moreover, the treating person or examining person is less physically stressed. The robot arm 14, however, can be an instrument holding arm, with the control parameters being taken via the display unit 4 connected to the computing unit 1.

The computing unit 1 also can be supplied with the subject signals that can be generated by an intra-operative imaging method, these signals likewise being displayed at the display unit 4 or at the further display unit 11 and providing the examining person or treating person with additional, real-time image information. An intra-operative imaging method is especially advantageous that is based on the electrical conversion of physical signals, particularly optical and/or acoustic signals, and/or radiation. Endoscopy and/or laparoscopy and/or ultrasound are particularly suited as such intra-operative imaging methods, particularly when the real-time image that can thus be produced and the virtual, multi-dimensional image can be displayed at the display unit 4, or the further display unit 11, via the computing unit 1 in combined form. The real-time image, for example, can be displayed on an additional display unit that is not shown.

Figure 6:
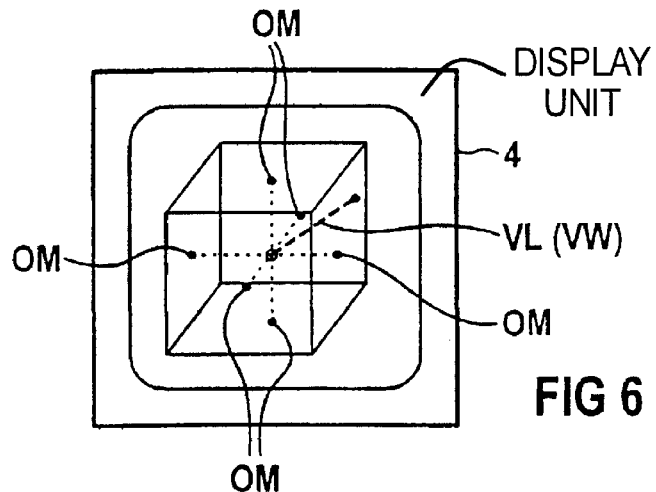
Figure 7:
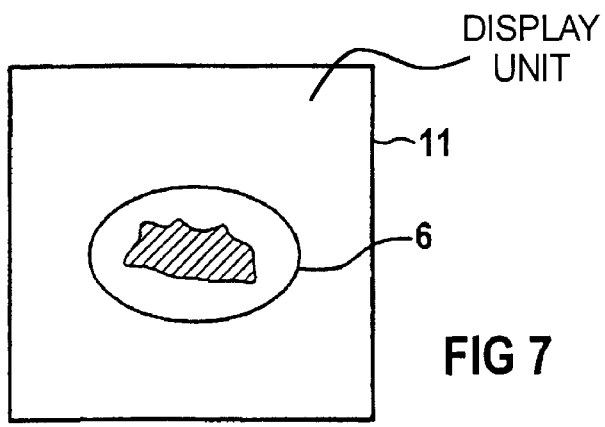

To make information about the spatial arrangement in the subject 2 of the endoscope and/or laparoscope and/or the ultrasound applicator and/or an instrument 23, the computing unit 1 has a locator 24 for real-time location detection of the endoscope and/or laparoscope and/or the instrument 23 on the basis of beam attenuation, or location-dependent influences on ultrasound, optical, magnetic and/or electrical signals. A location generator 15 generates a location mark OM in the virtual image corresponding to the real-time location of the endoscope and/or laparoscope and/or the ultrasound applicator and/or the instrument 23 at the display unit 4 (FIG. 6). Not only the location but also, using a line generator 16 for generating a connecting line VL, the adjustment path VW of the endoscope and/or the laparoscope and/or the ultrasound applicator and/or the instrument 23 can be displayed by the location generator 15 as a channel or line in the virtual three-dimensional image. This allows the introduction channel of the endoscope and/or the laparoscope and/or the instrument 23 to be closely tracked in the virtual multi-dimensional image (FIG. 6). When the location mark OM is displayed as a location window at the display unit 4 or at the further display unit 11 and when the corresponding real-time image of the endoscope and/or laparoscope is displayed in this location window, then the treating person or examining person, in addition to obtaining the spatial arrangement of the endoscope and/or laparoscope from the virtual three-dimensional image, is shown not only location information but also a real-time image of the location (FIG. 7).

Figure 8:
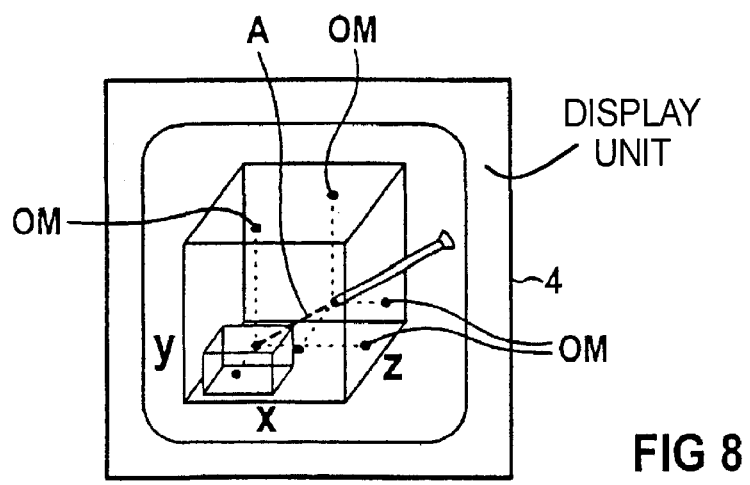

It is also advantageous (FIG. 8) for the computing unit 1 to determine the spatial coordinates 20 (X, Y, Z) and/or the distance A between two places or locations that can be identified in the virtual and/or real image allocated to it, so that a data-based determination of the spatial relationships and/or of the subject relationships is also possible. For example, the entry channel of the endoscope and/or laparoscope and/or the ultrasound applicator thus can be predetermined in view of the length, or can be currently measured. Likewise, the size of a region of interest can be identified and the distance of an instrument 23 from an organ or vessel can be identified.

Figure 9:
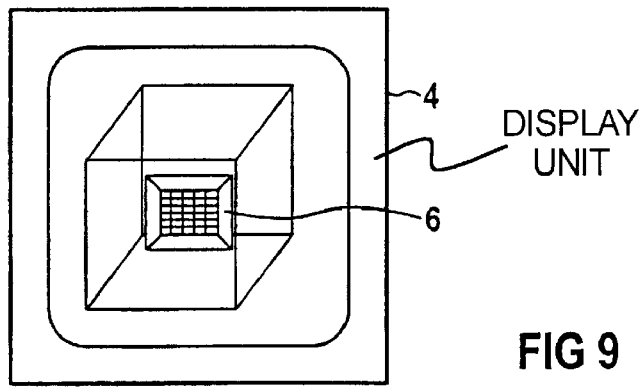
Figure 10:
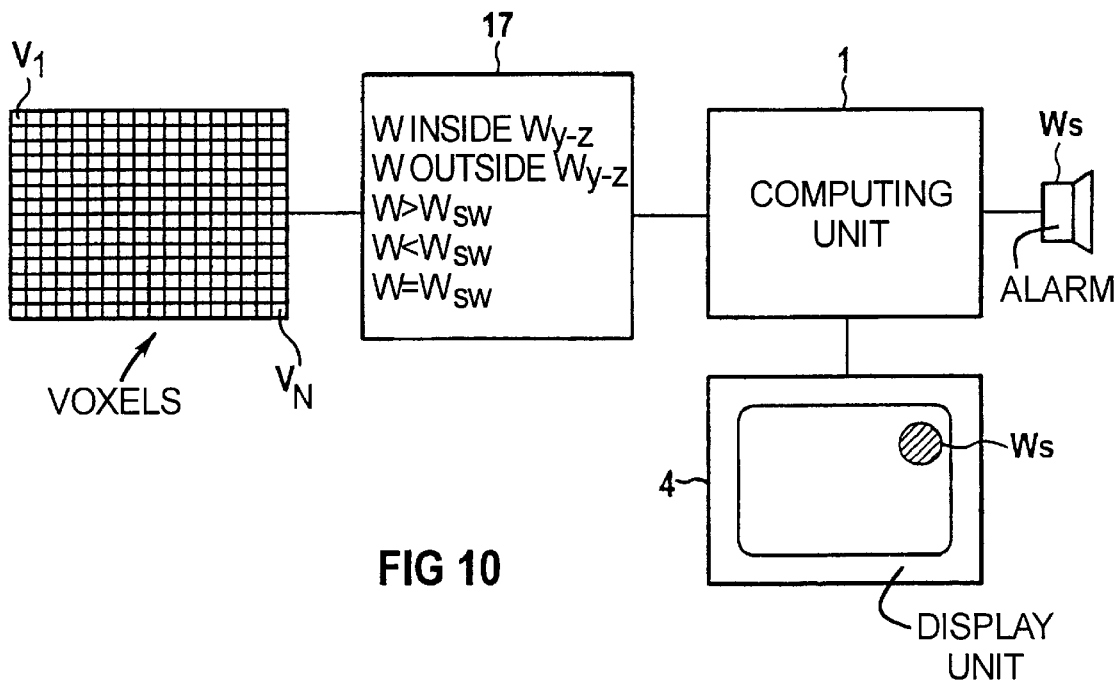
FIG. 10 is a block diagram of an evaluation unit, and connected components, of the medical-technical system of FIG. 1.

For planning an intervention with an endoscope and/or laparoscope and/or the ultrasound applicator and/or some other instrument 23, it is advantageous for the control unit 9 to have an evaluation unit 17 allocated to it for evaluating at least one voxel $V_1$–$V_N$ in the window 6 dependent on whether its voxel value W lies within or outside a prescribable area and/or under and/or over and/or equal to a prescribable voxel threshold $W_{sw}$ (FIGS. 9, 10). For example, an adjustment of the window 6 can be allowed in only one direction if no voxel value W of the voxels $V_x$ in the window 6 lies in the prescribable area $W_{y-z}$. It is also possible to only allow this adjustment when the voxel values W of the voxels $W_x$ in the window 6 lie below and/or above and/or equal to a prescribable voxel threshold $W_{sw}$. Within the framework of the invention, only a predetermined voxel value W can be considered in the window 6. However, it is also possible to take a selection of, or to take all, voxels $V_1$–$V_N$ in the window 6 into consideration. As a result of this embodiment of the inventive medical-technical system, control of the window 6, and thus the display or planning of an intervention channel, is possible without risk of, for example, nicking a vessel or penetrating an organ. At the very least, however, a beneficial location for this channel can be selected or calculated. When, for example, the voxel values W of an organ or of a vessel are known, then the range of voxel values of the organ or of the vessel is entered to the computing unit 1 as the prescribable range $W_{y-z}$ via the input unit 8. An indication is also provided that an adjustment of the window 6 must not ensue in this prescribable value range. It is likewise possible to enter a lower voxel value and an upper voxel value and to allow an adjustment of the window 6 only in the voxel range below or above these values. Alternatively, the range of voxel values can also be prescribed that lies outside the range of voxel values of the organ and/or of the vessel, with an adjustment of the window 6 being allowed or possible only in this region or these regions. Given an adjustment of the window 6 into a region that is not permitted, moreover, an alarm signal WS can be generated via the computing unit 1, for example at the display unit 4, or an acoustic signal can be generated.

Figure 11:
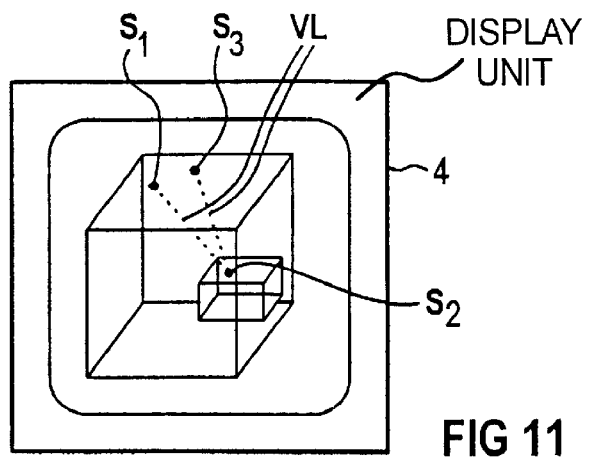

It is advantageous for planning the intervention for the computing unit 1 to have a line generator 16 allocated to it for generating a connecting line VL between a first location S1 and a second location S2 or between first and second locations in the virtual multi-dimensional image (FIG. 11). The connecting line VL can represent a possible intervention channel. In a preferred development, the connecting line VL is calculated via the computing unit 1 proceeding from a first location S1 that, for example, defines a planned entry location for the introduction of the endoscope and/or laparoscope and/or ultrasound applicator and/or an instrument 23 into the subject 2, taking at least one prescribable voxel value W into consideration, to the second location S2 that defines a region of interest or a location of interest. As already explained, the intervention channel can be predetermined such that optimally no vessel or organ is damaged and/or penetrated. The first location S1, for example, can be defined by setting a mark in the virtual multi-dimensional image. The second location S2 can likewise be defined by setting a further mark or by the location detector 24. Via the computing unit 1, the connecting line VL can be calculated taking the (at least one) voxel value W into consideration and can be displayed in the virtual multi-dimensional image at the display unit 4. Preferably, however, the computing unit 1 can also calculate a third location S3 taking the at least one voxel value W into consideration and S3 proceeding from the second location S2, this third location S3, for example, identifies the region to be examined or the subject to be examined, this third location S3 being optimally close to the first location S1 that identifies the desired intervention location. The connecting line VL that is thus calculated is preferably likewise displayed at the display unit 4. The best intervention point or the best intervention location thus can be predetermined on the basis of organ-related or vessel-related conditions. Within the framework of the invention a number of first and/or second and/or third locations can be prescribed and/or calculated. On the basis of the point S3 calculated by the computing unit 1, a first location can thus be selected via the joystick 7 and/or the input unit 8 and/or the touch screen 21 and/or the voice input unit 22, and the optimization algorithm can be restarted.

When the endoscope and/or laparoscope has an imaging modality allocated to it, then not only are optical real time images obtained therefrom, but also the image signals generated by the imaging modality can be displayed. The employment of an ultrasound modality is especially advantageous here.

Within the framework of the invention, the computing unit 1 can have a data memory 18 allocated to it wherein subject-related data that can be displayed at the display units 4 and/or 11 are stored. So that the treating person or the examining person can also receive information about the physiological condition of the subject 2 to be examined, a physiological signal acquisition system 19 can be provided. In particular, ECG signals, respiration signals, blood pressure signals, temperature signals, etc., as the physiological signals, can be displayed as data or can be optically displayed at the display unit 4 or the further display unit 11 via the computing unit 1.

Although modifications and changes may be suggested by those skilled in the art, it is the intention of the inventors to embody within the patent warranted hereon all changes and modifications as reasonably and properly come within the scope of their contribution to the art.

We claim as our invention:

1. A medical-technical system comprising:
   an imaging system operable according to a pre-operative imaging modality to obtain subject signals from an examination subject;
   a computing unit supplied with said subject signals for calculating a multi-dimensional image dataset from said subject signals;
   a display unit connected to said computing unit for displaying a virtual, multi-dimensional image produced in said computing unit from said multi-dimensional image dataset;

a window generator connected to said computing unit for generating a controllable window displayed at said display unit; and a control unit connected to said computing unit for controlling production of said virtual, multi-dimensional image in said computing unit by including a virtual location of said window in said virtual, multi-dimensional image, said virtual location being controlled by said control unit so that said window displayed at said display unit contains a portion of said virtual, multi-dimensional image surrounded by said window at said virtual location.

2. A medical-technical system as claimed in claim 1 comprising a further imaging system operable according to an imaging modality to obtain further subject signals from an examination subject, said further subject signals being supplied to said computing unit, and said computing unit producing said virtual, multi-dimensional image based on at least one of said subject signals and said further subject signals.

3. A medical-technical system as claimed in claim 2 wherein said imaging system is operable according to a first pre-operative imaging modality and wherein said further imaging system is operable according to a second pre-operative imaging modality, said second pre-operative imaging modality being different from said first pre-operative imaging modality, and wherein said computing unit calculates said multi-dimensional image dataset from said subject signals and said further subject signals.

4. A medical-technical system as claimed in claim 3 wherein said computing unit calculates a first multi-dimensional image dataset from said subject signals and calculates a second multi-dimensional image dataset from said further signals and wherein said display unit displays a first virtual, multi-dimensional image produced in said computing unit from said first multi-dimensional image dataset and displays a second virtual, multi-dimensional image produced in said computing unit from said second multi-dimensional image dataset.

5. A medical-technical system as claimed in claim 4 wherein said computing unit calculates a first three-dimensional image dataset from said subject signals and calculates a second three-dimensional image dataset from said further signals and wherein said display unit displays a first virtual, three-dimensional image produced in said computing unit from said first three-dimensional image dataset and displays a second virtual, three-dimensional image produced in said computing unit from said second three-dimensional image dataset.

6. A medical-technical system as claimed in claim 4 wherein said computing unit operates on at least one of said first multi-dimensional dataset and said second multi-dimensional dataset to produce a manipulated multi-dimensional dataset, and wherein said display unit displays a manipulated virtual, multi-dimensional image produced in said computing unit from said manipulated multi-dimensional image dataset.

7. A medical-technical system as claimed in claim 6 wherein said computing unit operates on at least one of said first multi-dimensional dataset and said second multi-dimensional dataset to produce a manipulated multi-dimensional dataset, and wherein said display unit displays a manipulated virtual, multi-dimensional image produced in said computing unit from said manipulated multi-dimensional image dataset.

8. A medical-technical system as claimed in claim 1 wherein said computing unit calculates a three-dimensional image dataset from said subject signals, and wherein said display unit displays a virtual, three-dimensional image produced in said computing unit from said three-dimensional image dataset.

9. A medical-technical system as claimed in claim 1 comprising a further display unit, connected to said computing unit and to said control unit, said further display unit displaying only a portion of said virtual, multi-dimensional image contained within said window.

10. A medical-technical system as claimed in claim 9 wherein said computing unit calculates a three-dimensional image dataset from said subject signals and wherein said display unit displays a virtual, three-dimensional image produced in said computing unit from said three-dimensional image dataset, and wherein said window comprises a virtual channel in said virtual, three-dimensional image according to which said window is controlled by said control unit.

11. A medical-technical system as claimed in claim 10 wherein each of said window and said virtual channel has a shape, and wherein said control unit controls the shape of at least one of said window and said virtual channel.

12. A medical-technical system as claimed in claim 10 wherein said computing unit calculates said virtual channel from said multi-dimensional image dataset.

13. A medical-technical system as claimed in claim 1 wherein said window has a shape, and wherein said control unit controls the shape of said window.

14. A medical-technical system as claimed in claim 1 wherein said window generator generates a plurality of controllable windows, and wherein said control unit controls production of said virtual, multi-dimensional image in said computing unit by including respective virtual locations of each of said plurality of windows in said virtual, multi-dimensional image, said respective virtual locations being controlled by said control unit and each of said plurality of windows containing respective portions of said virtual multi-dimensional image within the respective virtual locations.

15. A medical-technical system as claimed in claim 14 comprising a further display unit, connected to said computing unit and to said control unit, said display unit and said further display unit respectively displaying different portions of said virtual, multi-dimensional image contained within different windows in said plurality of windows.

16. A medical-technical system as claimed in claim 15 wherein said computing unit calculates a three-dimensional image dataset from said subject signals and wherein said display unit and said further display unit each display a virtual, three-dimensional image produced in said computing unit from said three-dimensional image dataset, and wherein each window comprises a virtual channel in said virtual, three-dimensional image according to which said window is controlled by said control unit.

17. A medical-technical system as claimed in claim 16 wherein each of said windows and each of said virtual channels has a shape, and wherein said control unit controls the shape of at least one window and the virtual channel associated therewith.

18. A medical-technical system as claimed in claim 16 wherein said computing unit calculates said virtual channel from said multi-dimensional image dataset.

19. A medical-technical system as claimed in claim 1 further comprising an instrument representation generating unit connected to said computing unit and connected to said control unit, said instrument representation generating unit generating a representation of at least one virtual instrument, said representation being displayed in said virtual, multi-dimensional image at said display unit at a position in said virtual, multi-dimensional image controlled by said control unit.

20. A medical-technical system as claimed in claim 19 further comprising a controllable robot arm connected to said computing unit, and wherein said computing unit generates control signals, corresponding to the position of said representation in said virtual, multi-dimensional image, said control signals being supplied to said robot arm for controlling operation of said robot arm.

21. A medical-technical system as claimed in claim 1 comprising a further imaging system operable according to a preoperative imaging modality to obtain real-time subject signals from an examination subject, and wherein said computing unit is connected to said further imaging system and receives said real-time subject signals therefrom, and wherein said computing unit causes said real-time subject signals to be displayed on said display unit as a real-time image.

22. A medical-technical system as claimed in claim 21 wherein said further imaging system comprises an imaging system selected from the group consisting of optical imaging systems, acoustic imaging systems and radiological imaging systems.

23. A medical-technical system as claimed in claim 22 wherein said computing unit combines said real-time subject signals with said subject signals obtained from said imaging system, to embody said real-time image in said virtual, multi-dimensional image for display by said display unit.

24. A medical-technical system as claimed in claim 21 wherein said display unit has a plurality of display areas, and said display areas respectively displaying said virtual, multi-dimensional image and said real-time image.

25. A medical-technical system as claimed in claim 23 further comprising a further display unit connected to said computing unit and wherein said real-time image and said virtual, multi-dimensional image are respectively displayed on said display unit and said further display unit.

26. A medical-technical system as claimed in claim 21 wherein said further imaging system comprises an imaging system having an imaging instrument selected from the group consisting of an endoscope, a laparoscope, and an ultrasound probe.

27. A medical-technical system as claimed in claim 26 further comprising a locator carried by said imaging instrument which emits a location signal, and said medical-technical system further comprising a location generator, supplied with said location signal, which generates a location mark in said virtual, multi-dimensional image identifying a real-time location of said imaging instrument at said display unit.

28. A medical-technical system as claimed in claim 27 wherein said location mark generator also generates signals representing an adjustment path for said imaging instrument, said signals for said adjustment path also being supplied to said display unit for inclusion in said virtual, multi-dimensional image.

29. A medical-technical system as claimed in claim 27 wherein said location mark comprises a location window.

30. A medical-technical system as claimed in claim 1 wherein said imaging system includes an imaging instrument, said imaging instrument carrying a locator which emits a location signal, and said medical-technical system further comprising a location generator, supplied with said location signal, which generates a location mark in said virtual, multi-dimensional image identifying a real-time location of said instrument at said display unit.

31. A medical-technical system as claimed in claim 1 wherein said computing unit has a data memory containing subject data, and wherein said computing unit causes said subject data to be displayed at said display unit.

32. A medical-technical system as claimed in claim 1 further comprising a physiological signal acquisition system for acquiring physiological signals from the examination subject, connected to said display unit, said display unit displaying said physiological signals.

33. A medical-technical system as claimed in claim 1 further comprising means for determining a spatial relationship between at least two locations in said virtual, multi-dimensional image.

34. A medical-technical system as claimed in claim 33 wherein said means for determining comprises means for determining a spatial relationship between two real locations in said virtual, multi-dimensional image.

35. A medical-technical system as claimed in claim 33 wherein said means for determining comprises means for determining a spatial relationship between two virtual locations in said virtual, multi-dimensional image.

36. A medical-technical system as claimed in claim 1 further comprising a further imaging system operable according to an intra-operative imaging modality to obtain real-time subject signals from the examination subject, and wherein said display unit displays a real-time image formed from said real-time subject signals, and said medical-technical system further comprising means for determining a spatial relationship between at least two locations in said real-time image.

37. A medical-technical system as claimed in claim 1 wherein said window encloses a portion of said virtual, multi-dimensional image comprised of a plurality of voxels, each voxel having a voxel value associated therewith, and wherein said control unit contains an evaluation unit which evaluates the voxel value associated with at least one voxel in said window relative to a predetermined voxel value criterion, said evaluation unit generating a signal representing an evaluation result dependent upon evaluation of said voxel value relative to said predetermined criterion.

38. A medical-technical system as claimed in claim 37 wherein said evaluation unit evaluates whether said voxel value is inside or outside of a selectable area.

39. A medical-technical system as claimed in claim 37 wherein said evaluation unit evaluates whether said voxel value is above or below a selectable reference value.

40. A medical-technical system as claimed in claim 37 wherein said evaluation unit evaluates whether said voxel value is inside or outside of a selectable area and above or below a selectable reference value.

41. A medical-technical system as claimed in claim 37 wherein said control unit permits or suppresses directional control of said window dependent on said signal representing said evaluation result.

42. A medical-technical system as claimed in claim 1 further comprising means for generating a connecting line between a first location and a second location in said virtual, multi-dimensional image.

43. A medical-technical system as claimed in claim 42 wherein said means for generating a connecting line comprises means for generating a connecting line starting at said first location and proceeding to said second location.

44. A medical-technical system as claimed in claim 43 wherein said imaging system includes an imaging instrument and a locator carried by said imaging instrument which generates a real-time signal identifying a location of said imaging instrument, and wherein said means for generating a connecting line defines said second location to correspond to said real-time location of said imaging instrument.

45. A medical-technical system as claimed in claim 42 wherein said window encloses a portion of said virtual, multi-dimensional image comprised of a plurality of voxels, each voxel having a voxel value associated therewith, and wherein said control unit contains an evaluation unit which evaluates the voxel value associated with at least one voxel in said window relative to a predetermined voxel value criterion, said evaluation unit generating a signal representing an evaluation result dependent upon evaluation of said voxel value relative to said predetermined criterion, and wherein said computing unit is connected to said means for generating a line and wherein said computing unit calculates said first location dependent on said voxel value of said at least one voxel in said window.

46. A medical-technical system as claimed in claim 45 wherein said computing unit calculates a third location dependent on said voxel value, said third location being close to said first location and said connecting line being displaceable from between said first location and said second location to between said third location and said second location.

47. A medical-technical system as claimed in claim 46 wherein said computing unit calculates a plurality of locations selected from at least one group of locations consisting of a plurality of first locations, a plurality of second locations, and a plurality of third locations.

48. A medical-technical system as claimed in claim 47 further comprising an examination/treatment instrument and a location signal emitter carried by said examination/treatment instrument which emits a real-time signal identifying a location of said examination/treatment instrument, said signal emitted by said location emitter being supplied to said computing unit and said computing unit generating an indicator signal if a position of said examination/treatment instrument deviates from said connecting line.

49. A medical-technical system as claimed in claim 1 further comprising a further imaging system operable according to an intra-operative imaging modality to obtain real-time subject signals from an examination subject, said real-time signals being supplied to said display unit and said display unit displaying a real-time image based on said real-time subject signals, and said medical-technical system further comprising means for generating a connecting line between a first location and a second location in said real-time image.

50. A medical-technical system as claimed in claim 49 wherein said means for generating a connecting line comprises means for generating a connecting line starting at said first location and proceeding to said second location.

51. A medical-technical system as claimed in claim 50 wherein said imaging system includes an imaging instrument and a locator carried by said imaging instrument which generates a real-time signal identifying a location of said imaging instrument, and wherein said means for generating a connecting line defines said second location to correspond to said real-time location of said imaging instrument.

52. A medical-technical system as claimed in claim 49 wherein said window encloses a portion of said virtual, multi-dimensional image comprised of a plurality of voxels, each voxel having a voxel value associated therewith, and wherein said control unit contains an evaluation unit which evaluates the voxel value associated with at least one voxel in said window relative to a predetermined voxel value criterion, said evaluation unit generating a signal representing an evaluation result dependent upon evaluation of said voxel value relative to said predetermined criterion, and wherein said computing unit is connected to said means for generating a line and wherein said computing unit calculates said first location dependent on said voxel value of said at least one voxel in said window.

53. A medical-technical system as claimed in claim 52 wherein said computing unit calculates a third location dependent on said voxel value, said third location being close to said first location and said connecting line being displaceable from between said first location and said second location to between said third location and said second location.

54. A medical-technical system as claimed in claim 53 wherein said computing unit calculates a plurality of locations selected from at least one group of locations consisting of a plurality of first locations, a plurality of second locations, and a plurality of third locations.

55. A medical-technical system as claimed in claim 54 further comprising an examination/treatment instrument and a location signal emitter carried by said examination/treatment instrument which emits a real-time signal identifying a location of said examination/treatment instrument, said signal emitted by said location emitter being supplied to said computing unit and said computing unit generating an indicator signal if a position of said examination/treatment instrument deviates from said connecting line.

* * * * *